Aug. 4, 1942.  J. A. LAWLER  2,292,325
GEAR SHIFTING MECHANISM
Filed Dec. 13, 1937  5 Sheets-Sheet 5
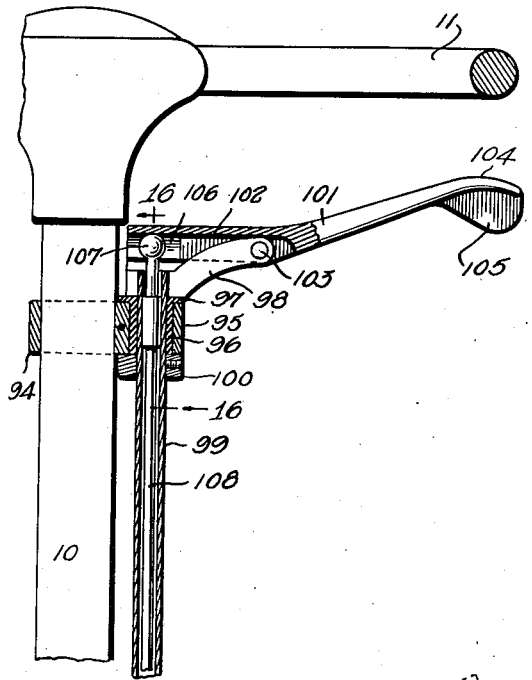
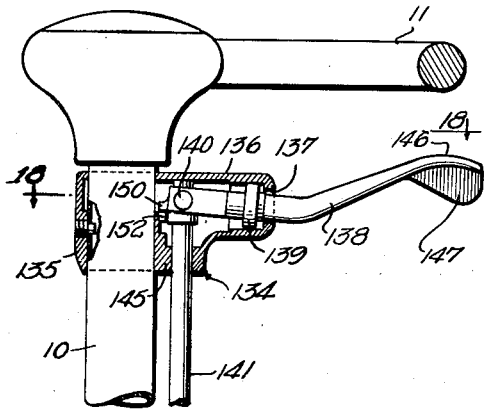
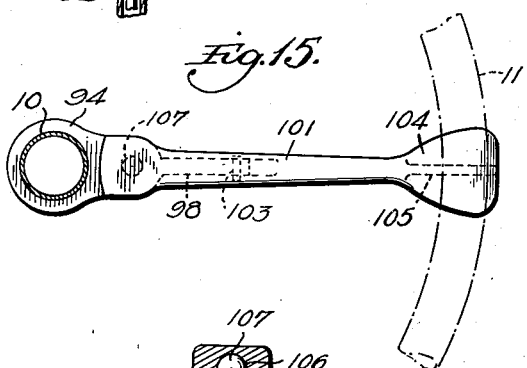
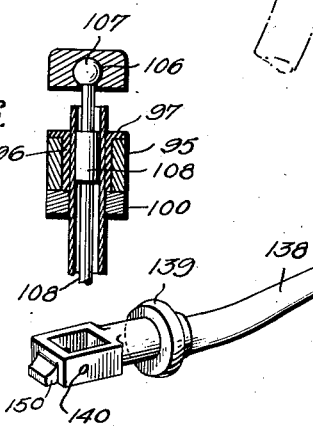
Inventor
J. A. LAWLER
By
Attorney Patented Aug. 4, 1942

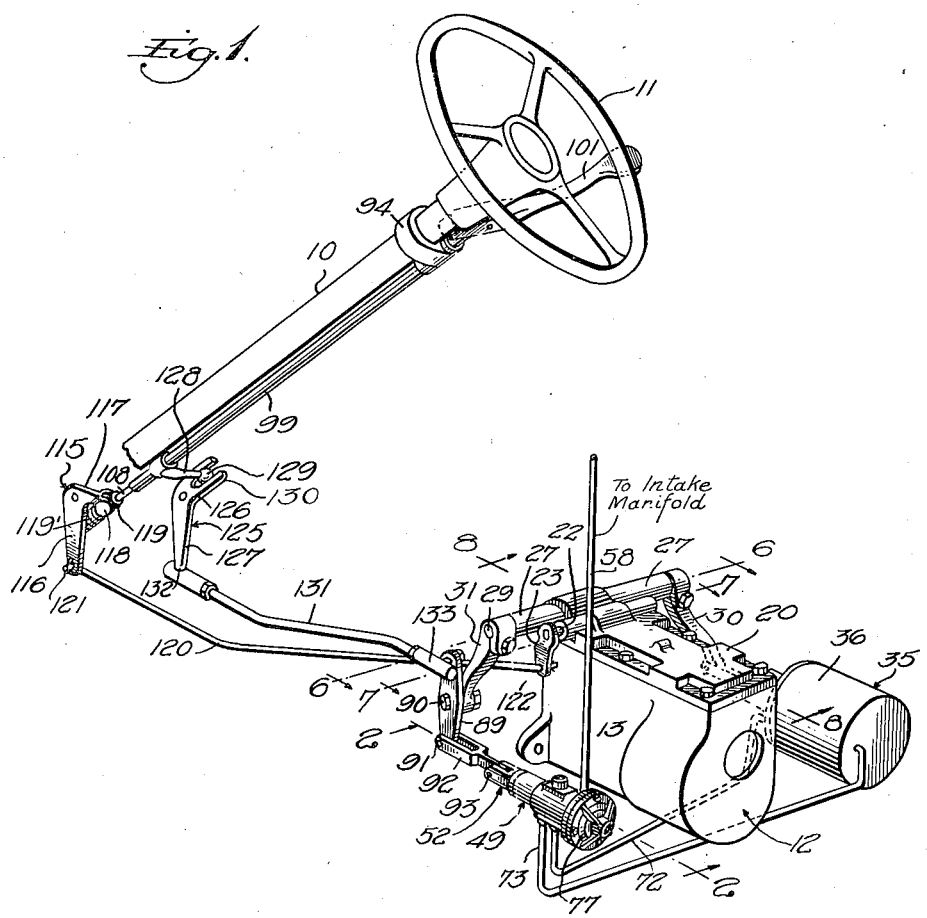
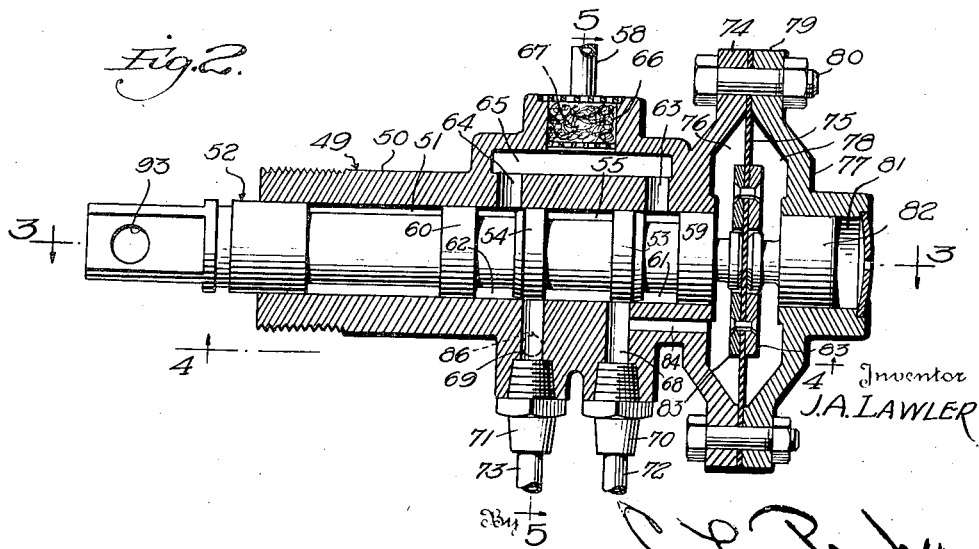

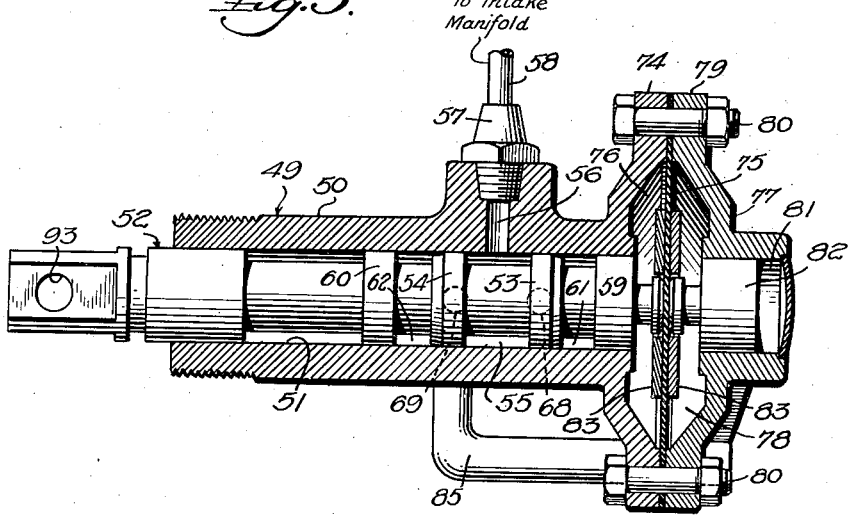
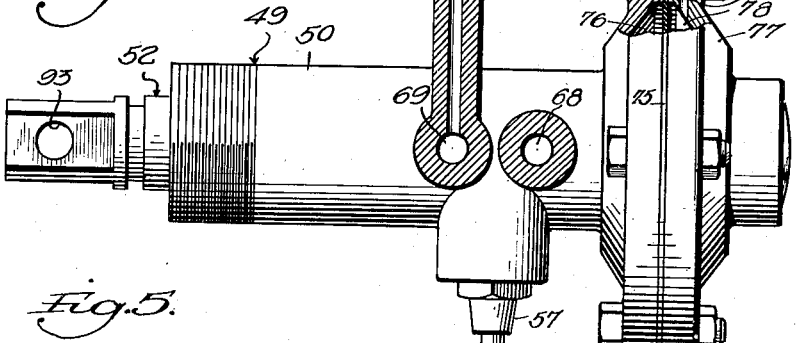
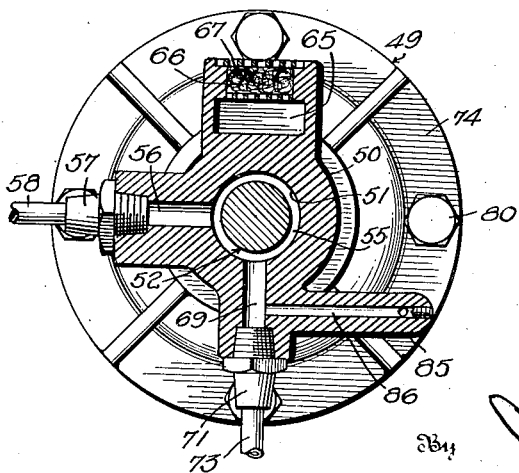

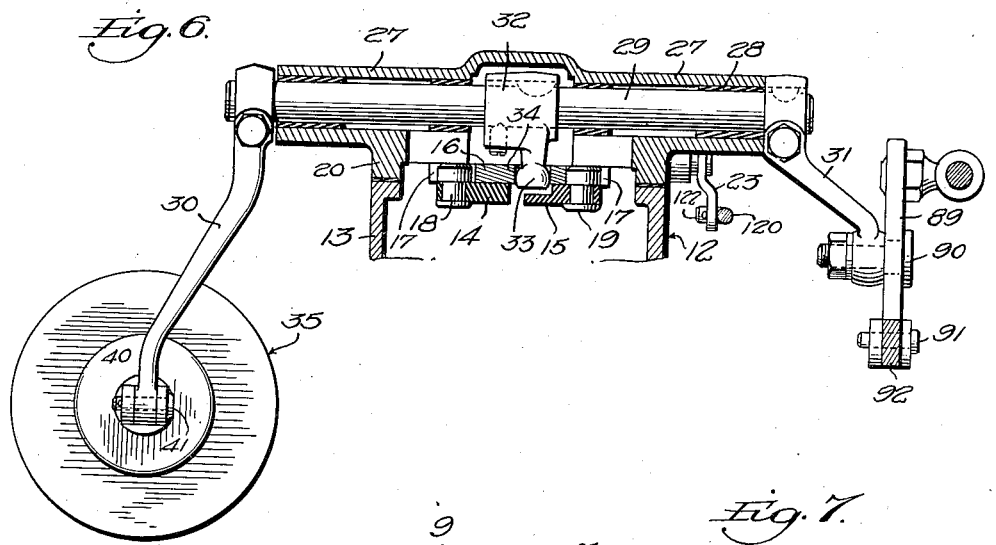
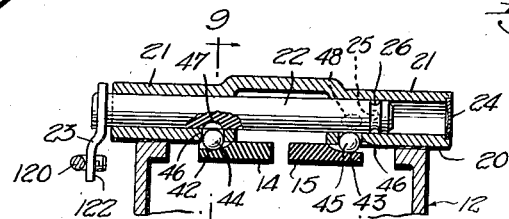
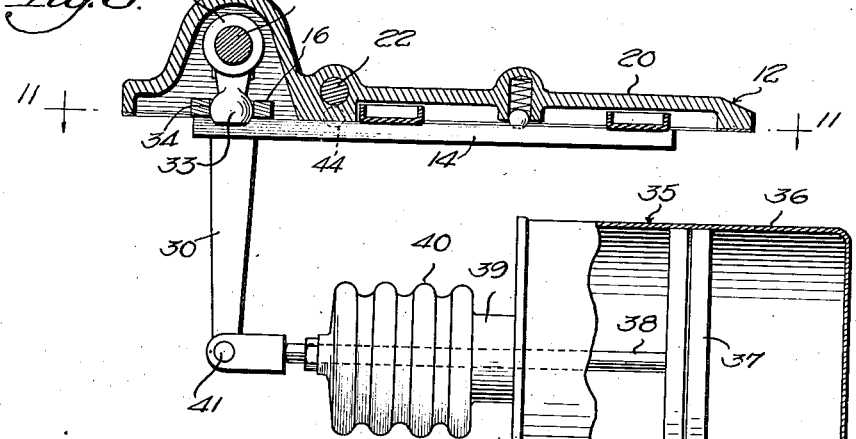
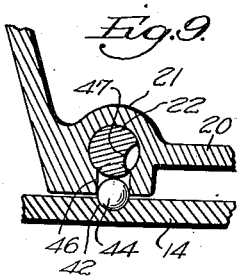
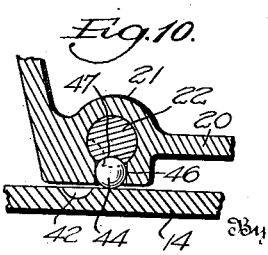

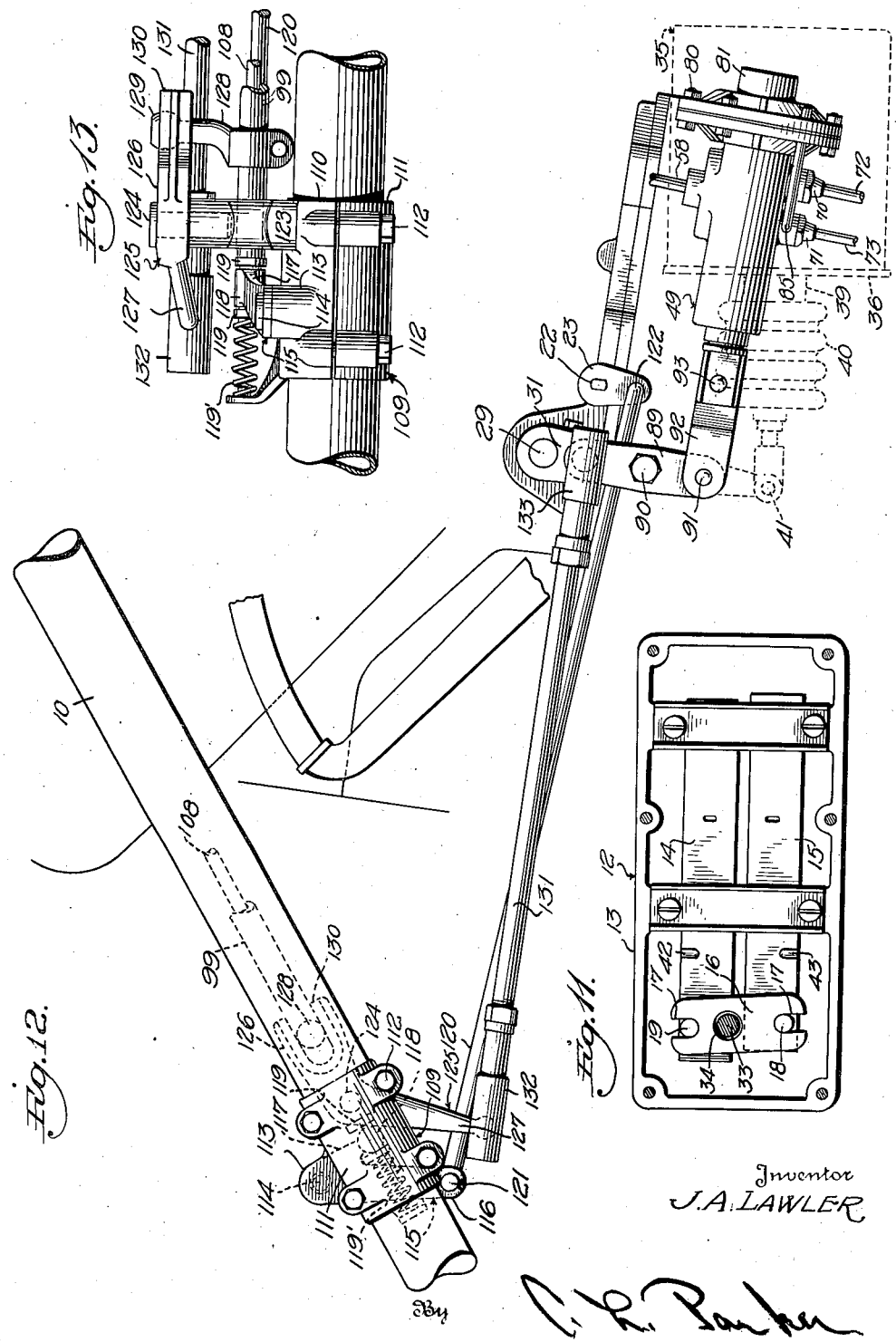

2,292,325

UNITED STATES PATENT OFFICE 2,292,325

GEAR SHIFTING MECHANISM

John A. Lawler, Franklin, Mich., assignor to Automatic Shifters, Inc., Richmond, Va., a corporation of Virginia Application December 13, 1937, Serial No. 179,604

44 Claims. (Cl. 74—335)

This invention relates to gear shifting mechanisms, and more particularly to a vacuum operated motor vehicle gear shifting mechanism wherein a differential fluid pressure motor is employed for effecting the shifting of the gears.

In the copending application of Henry W. Hey, Serial No. 169,288, there is described and claimed a gear shifting mechanism of the general character indicated above, wherein a novel valve mechanism is employed for controlling the operation of the shifting motor. Such valve mechanism is constructed and arranged so as to "vacuum-suspend" the piston of the shifting motor in any position in which movement of the manually operable lever connected to the valve mechanism is arrested. This is accomplished by providing relatively movable valve members which are adapted to assume neutral positions with respect to each other with both ends of the shifting motor in limited communication with the source of pressure differential, such as the intake manifold of a motor vehicle, whereby air will be exhausted from both ends of the cylinder of the shifting motor.

The manually operable lever which controls the operation of the valve mechanism referred to also is connected to control the valve of a crossover motor by means of which either shift rail of a motor vehicle transmission is selected for operation. The manually operable handle referred to is, in effect, a miniature gear shift lever which is placed at such a position as to permit the floor boards of the vehicle to be cleared, and the lever partakes of the same movements as a conventional gear shift lever for shifting into different gear positions. The valve mechanisms which control the shifting and crossover motors are provided with means associated therewith for reacting against the operator's hand in such a manner that the operator feels a resistance to movement of the manually operable handle to a degree proportionate to the resistance encountered by the shifting and crossover motors in performing their functions, whereby the operator is enabled to "feel" the manually operable handle into the gear positions in accordance with conventional practice. The various features referred to form generally the subject matters of the above mentioned copending application.

In most of the power operated gear shifting mechanisms of which I am aware, the selection of a transmission shift rail for operation by the shifting motor has been accomplished by moving some form of motion transmitting element selectively into engagement with the shift rails to render the shifting motor operative for moving either rail.

In my copending application Serial No. 161,318, filed August 27, 1937, I have described and claimed a gear shifting mechanism wherein a greatly simplified form of shift rail selecting and actuating mechanism is employed. In such shifting mechanism, a simple rock shaft is employed for selectively holding locking elements in engagement with the shift rails to render only one shift rail at a time capable of movement, together with means operative for tending to move both of the shift rails. The latter means is in the form of a "whiffletree" lever the ends of which are connected to move the respective shift rails while power is applied to the lever centrally thereof.

The selecting means functions in a conventional gear set to lock one shift rail, and the whiffletree will be pivoted at its connection with such shift rail whereby the application of power centrally of the lever will transmit movement to the other shift rail. Among other reasons, this construction is highly advantageous in that it eliminates the use of any substantial amount of force in selecting the shift rails for operation, only a slight amount of work being required to rock the selecting shaft between its respective positions. The locking elements require no force for moving them into locking engagement, and it is unnecessary to provide a motion transmitting element which is selectively movable between the two shift rails.

An important object of the present invention is to provide a novel gear shifting mechanism which embodies the advantages of the follow-up vacuum suspending valve of application Serial No. 169,288 but which eliminates the necessity for employing a crossover motor and a control valve therefor, the selecting of the shift rails being accomplished manually by the operator.

A further object is to provide a mechanism of the character referred to by means of which a single control handle is connected to control the valve mechanism of the shifting motor and which, at the same time, is connected to easily transmit movement to manually select the shift rails for operation.

A further object is to provide a gear shifting mechanism wherein a manually operable lever partakes of one movement to operate the control valve mechanism of the shifting motor and in another direction to directly manually operate a rock shaft to select the shift rails for operation.

A further object is to provide control mechanism for the valve mechanism of the shifting motor and the shift rail selecting means which is extremely simple in construction, thus requiring the minimum number of parts for its operation.

A further object is to provide a mechanism of the character just referred to wherein the simplicity of the construction renders the control handle particularly adapted to be mounted beneath and adjacent the steering wheel of a motor vehicle, thus permitting "finger-tip" operation of the control handle without any necessity for the operator having to remove his hand from the steering wheel.

A further object is to provide an improved shifting mechanism of the general type shown in my copending application Serial No. 161,318, referred to above, wherein flexibility of installation is permitted in accordance with the characteristics of different motor vehicles.

More specifically, an important object is to provide a shifting mechanism wherein the structure is such as to permit the shifting motor to be arranged at either side of the transmission, and to control the shifting motor by a follow-up valve mechanism which likewise may be arranged at either side of the transmission, depending upon the characteristics of the particular installation.

A further object is to simplify the operation of the whiffletree lever by the shifting motor, the whiffletree being operated by a simple shaft arrangement, the shaft having a pair of cranks one of which directly engages the whiffletree and the other of which is directly connected to the shifting motor.

A further object is to provide a novel handle construction for transmitting movement to the control valve mechanism of the shifting motor and to the selecting shaft, the handle being mounted to transmit rocking movement to a control stem or shaft to accomplish one of the functions referred to and to effect axial sliding movement of the stem or shaft to accomplish the other function.

A further object is to provide a control handle arrangement which is particularly adapted to be mounted below and in proximity to the steering wheel of a motor vehicle to effect rocking or sliding movement of a control stem which may be arranged adjacent and parallel to the steering column thus facilitating the installation of the control handle and the parts operated thereby.

A further object is to provide a mechanism of this character wherein the control handle is movable substantially in an H-shaped path, and wherein the elements operated by the handle are so constructed and arranged as to prevent the handle from being moved except in the H-shaped path referred to, thus eliminating the necessity for any means for guiding the handle in its movement.

Other objects and advantages of the invention will become apparent during the course of the following description.

In the drawings I have shown two embodiments of the invention. In this showing—

Figure 1 is a perspective view of the mechanism associated with parts of a motor vehicle, Figure 2 is a central vertical sectional view of the control valve mechanism taken substantially on line 2—2 of Figure 1, Figure 3 is a horizontal sectional view through the valve mechanism taken on line 3—3 of Figure 2, Figure 4 is a similar view taken substantially on line 4—4 of Figure 2 looking upwardly, Figure 5 is a vertical sectional view taken substantially on line 5—5 of Figure 2, Figure 6 is a transverse vertical sectional view through the forward end of the transmission, on line 6—6 of Figure 1, parts being shown in section and parts being broken away, Figure 7 is a similar view on line 7—7 of Figure 1, Figure 8 is a vertical longitudinal sectional view through the transmission cover plate taken substantially on line 8—8 of Figure 1, showing one of the shift rails in position, with the transmission casing and the parts contained therein omitted, Figure 9 is a fragmentary vertical section on line 9—9 of Figure 7 showing the associated shift rail locked in neutral position, Figure 10 is a similar view showing the associated shift rail unlocked and moved out of neutral position, Figure 11 is a horizontal sectional view taken approximately on the line 11—11 of Figure 8 showing the shift rail guides and whiffletree lever in elevation and showing the actuating lever in section, Figure 12 is a side elevation of the apparatus shown in connection with parts of the motor vehicle, Figure 13 is a top face view of the portion of the control mechanism carried by the steering column adjacent the lower end thereof, parts being broken away, Figure 14 is a rear elevation of the steering column and the control mechanism carried thereby, parts being shown in section, Figure 15 is a plan view of the manually operable control lever, a portion of the steering wheel being shown in dotted lines, Figure 16 is a fragmentary sectional view on line 16—16 of Figure 14, Figure 17 is a view similar to Figure 14 showing a modified form of control lever mechanism, Figure 18 is a detail section on line 18—18 of Figure 17, and, Figure 19 is a detail perspective view of the modified form of control handle.

Referring to Figure 1, the numeral 10 designates the steering column of a motor vehicle having the usual steering wheel 11 mounted at its upper end. The usual engine (not shown) transmits power to drive a vehicle through a transmission indicated as a whole by the numeral 12.

The transmission comprises a casing 13 in which are arranged the usual low and reverse gear shift rail 14, and second and high gear shift rail 15, these rails being movable to provide the desired gear ratios as will be apparent. The shift rails per se and the gear elements moved thereby are conventional and form no part of the present invention.

For the purpose of transmitting movement to either shift rail, a whiffletree lever 16 extends across the shift rails as shown in Figure 11. The ends of this lever are provided with slots 17 to receive upwardly projecting pins 18 and 19 carried by the respective shift rails 14 and 15. Upon the transmission of force to the whiffletree lever intermediate its ends, the lever will tend to move both of the shift rails, and means to be described is provided for locking one of the shift rails at a time so that actuation of the whiffletree lever will transmit movement to the other shift rail.

The transmission casing 13 is provided with a cover plate 20 which carries all of the mechanism necessary for selecting the shift rails for operation and for transmitting movement to the whiffletree lever 16 to effect the shifting operation. The means for selectively locking the shift rails in neutral position is shown in detail in Figures 7, 8 and 9. The cover plate 20 is provided with a pair of aligned bearings 21 in which is arranged a rock shaft 22, one end of this shaft projecting beyond the associated bearing 21 and being provided with a crank 23 which is operated in a manner to be described. The outer end of the other bearing 21 is capped as at 24. It will be apparent that the shaft 22 may project from either side of the transmission, depending upon the particular installation and the accessibility of the connections for operating the crank 23. It will be apparent that if the shaft 22 projects from the right hand bearing 21 in Figure 7, the cap 24 may be employed for closing the outer end of the left hand bearing 21. Any suitable means may be employed for fixing the shaft 22 against endwise movement. For example, a pin 25 carried by one of the bearings 21 may engage a groove 26 formed in the shaft 22.

The means for actuating the whiffletree lever 16 is shown in Figures 1, 6 and 8. The cover plate 20 is provided with a pair of aligned laterally extending integral bearings 27 preferably provided with bearing bushings 28 supporting a shaft 29. This shaft is provided at one end with an actuating crank 30 and at its opposite end with a control crank 31 to be described in detail later.

Between the bearing sections 27, the shaft 29 is provided with a hub 32 fixed thereto and provided with a depending crank arm 33 the lower end of which is substantially spherical in shape and arranged within an opening 34 formed intermediate the ends of the whiffletree lever. The crank 33 usually will be arranged closer to the shift rail 15 than to the rail 14 in order to impart greater movement to the latter shift rail for a given swinging movement of the shaft 29. This arrangement is employed with transmissions having synchronizing means associated with the second and high gear shift rail, in which case such shift rail partakes of relatively short movement into its respective gear positions.

The transmission casing and the parts contained therein have been omitted from Figure 8 to show the motor which is employed for actuating the crank 30. This motor is preferably of the differential pressure operated type and is indicated as a whole by the numeral 35. The motor comprises a cylinder 36 having a piston 37 reciprocable therein and provided with a piston rod 38 extending through a bearing 39 carried by one end of the cylinder 36. A collapsible boot 40 preferably is connected between the bearing 39 and the outer end of the piston rod 38 to exclude dirt and other foreign material from the bearing 39. The other end of the piston rod 38 is pivotally connected as at 41 to the lower end of the crank 30, as shown in Figures 6 and 8.

It will be apparent that operation of the motor 35 will swing the crank 30 to rock the shaft 29 whereby the crank arm 33 will effect movement of the whiffletree lever 16. The motor 35 may be suitably supported to permit it to swing to compensate for swinging movement of the crank 30. Rocking of the shaft 29, of course, will tend to transmit movement to both shift rails, and the shaft 22 is adapted to be rocked to effect the locking of either shift rail. The means shown for this specific purpose is similar to means shown in my copending application Serial No. 161,318 so far as the rocking of a shaft for accomplishing this result is concerned. However, in the copending application referred to vertically slidable pins are employed for effecting the locking action whereas the present construction makes use of balls for this purpose.

Referring to Figures 7, 9 and 10 it will be noted that the shift rails have their upper faces adjacent the remote edges of the rails milled to provide grooves 42 and 43 in the respective shift rails and these grooves are respectively engageable by balls 44 and 45. These balls are vertically movable in openings 46 in the bottoms of the bearings 21, as shown in Figure 7. It will be apparent that since the openings 46 are cylindrical, the balls have limited contact therewith and accordingly there is substantially negligible frictional resistance to the vertical movement of the balls 44 and 45. The shaft 22 is provided in the planes of the balls 44 and 45 with circumferentially offset notches 47 and 48 either of which may be brought into registration with its respective locking ball upon the rocking of the shaft 22. For example, when the shaft is in the position shown in Figure 9 a cylindrical portion of the shaft 22 will lock the ball 44 in its groove 42 to prevent movement of the shift rail 14 while the ball 45 will be movable upwardly into the recess 48 to permit the shift rail 15 to be moved. Conditions may be reversed to lock the rail 15 and release the rail 14 by rotating the shaft 22, when the shift rails are in neutral position, to move the recess 48 out of registration with the ball 45 and move the recess 47 into registration with the ball 44, as shown in Figures 7 and 10. Because of the extremely limited amount of work required for rocking the shaft 22 this operation may be performed manually, and such operation will be described in detail later.

The operation of the motor 35 is controlled by a valve mechanism indicated as a whole by the numeral 49 in Figure 1 and shown in detail in Figures 2 to 5 inclusive. The control valve comprises an elongated body 50 having a cylindrical bore 51 therethrough in which a valve indicated as a whole by the numeral 52 is slidable. The valve is provided with a pair of spaced heads 53 and 54 the remote portions of which are preferably tapered as shown in Figures 2 and 3. The space 55 between the heads referred to communicates with a radial port 56 connected by a union 57 to a pipe 58. This pipe preferably leads to the intake manifold of the motor vehicle engine to provide a source of non-atmospheric pressure which, together with the pressure of the atmosphere, preferably forms the differential pressure necessary for operating the motor 35.

Beyond the heads 53 and 54, the valve 52 is provided with heads 59 and 60 forming spaces 61 and 62 adjacent the remote sides of the respective heads 53 and 54. These spaces constantly communicate with ports 63 and 64, formed in the valve casing 50, and these ports, in turn, communicate with a manifold 65 which is in constant communication with the atmosphere through a port 66 which is relatively large and preferably filled with air filtering material 67.

The bottom portion of the valve casing 50 is provided with a pair of ports 68 and 69 provided with unions 70 and 71 for connecting them to pipes 72 and 73 respectively. It will be apparent that Figure 1 is a view looking toward the forward end of the vehicle, and accordingly the pipes 72 and 73 are connected respectively to the forward and rear ends of the motor cylinder 36.

It will be apparent that the space 55 between the valve heads 53 and 54 is in constant communication with the intake manifold through the pipe 58. The adjacent limits of the heads 53 and 54 are arranged at a slightly greater distance apart than the distance between the adjacent limits of the ports 68 and 69. When the valve 52 is in the neutral position shown in Figure 2, therefore, both ends of the motor cylinder 36 will be in limited communication with the intake manifold, regardless of the position of the motor piston 37, thus providing the highly desirable feature of "vacuum suspending" the piston 37 to provide instantaneous movement thereof when the valve 52 is moved to admit air into either of the ports 68 or 69. This feature will be referred to in detail later.

The valve 52 is connected for operation by the operator, and the present construction includes means for resisting movement of the valve 52 to a degree proportionate to the resistance encountered by the motor piston 37 in effecting any gear shifting operation. This feature, per se, is described and claimed in the copending application of Henry W. Hey Serial No. 169,288, referred to above.

One end of the valve casing 50 is provided with an outstanding flange 74 against which is seated the peripheral portion of a rubber or similar diaphragm 75, this diaphragm and a portion of the valve casing adjacent the diaphragm forming a chamber 76. A casing member 77 forms with the diaphragm 75 a second chamber 78, and the member 77 is provided with a flange portion 79 corresponding in shape and size to the flange 74 and secured thereto as at 80. It will be apparent that the diaphragm 75 is clamped between the two flanges 74 and 79.

The casing member 77 is provided with a cylindrical bore 81 in axial alignment with the bore 51 and slidably receiving the head 82 connected to or formed integral with the valve 52. The diaphragm 75 is connected centrally thereof to the valve 52 and is provided with opposite disk-like members 83 which are adapted to engage the adjacent portions of the valve casing 50 and casing member 77 to limit deflection of the diaphragm 75 and accordingly limit endwise movement of the valve 52. The members 83 accordingly provide means whereby manual shifting of the gears may be accomplished in the event of failure of power in the motor 35. Opposite sides of the diaphragm 75 are subject to the same differential pressures which exist on opposite sides of the motor piston 37 to tend to resist movement of the valve 52 to a degree proportional to the resistance encountered by the piston 37 in its movements. Referring to Figure 2, it will be noted that the diaphragm chamber 76 communicates with the port 68 through a passage 84. Accordingly the pressure present in the rear end of the cylinder 36 will be reproduced in the diaphragm chamber 76. The valve casing 50 is provided with an integral portion 85 (Figures 3, 4 and 5) having a passage 86 therethrough communicating at one end with the port 69 and at its opposite end with a port 87 formed in the casing member 77 and leading into the diaphragm chamber 78. Accordingly this chamber communicates with the port 69 whereby any pressure present in the forward end of the cylinder 36 will be reproduced in the chamber 78.

A single manually operable lever to be described is employed for directly operating the crank 23 to rock the locking shaft 22, and the same manual lever is employed for operating the valve 52. Referring to Figures 1, 6 and 12, the numeral 89 designates a floating lever, which is pivotally connected centrally of its length to the free end of the lever 31 as at 90. The lower end of the floating lever is pivotally connected as at 91 to the forked end of a link 92 the rear end of which is pivotally connected as at 93 to the forward end of the valve 52.

It will be apparent that if the lever 89 is rocked about the pivot 90, movement will be transmitted to the valve 52. It also will become apparent that if the upper end of the lever 89 is held stationary, and movement is transmitted to the lever by the crank 31, movement will be transmitted to the valve 52 to tend to return this valve to its normal position. These operations are utilized in providing the valve mechanism with a follow-up action to cause the motor piston 37 to move a distance proportionate to the distance at which the operator moves the manual lever to be described.

The steering column 10 is provided with a bearing bracket 94 extending to the right as viewed by the operator, to form a bearing 95 in which is rotatably mounted a cylindrical thimble 96. The upper end of the thimble is provided with an outstanding annular flange 97 rotatably supported by the upper end of the bearing 95. The thimble 96 is also provided with an arm 98 for a purpose to be described.

The thimble 96 is fixed with respect to a tubular member 99 arranged axially within the thimble and extending thereabove as shown in Figure 14. A collar 100 is secured to the tubular member 99 beneath and in contact with the bearing 95. Accordingly it will be apparent that the thimble 96, tubular member 99 and collar 100 are fixed against axial movement with respect to the bearing 95 but are rotatable with respect thereto.

A handle 101 is provided with a groove 102 therebeneath to receive the upper and outer end of the arm 98, the handle being pivotally connected to the arm 98, as at 103. The groove 102 substantially fits the arm 98 so that turning movement of the handle 101 parallel to the steering wheel 11 imparts turning movement to the tubular member 99. This movement is utilized in a manner to be referred to for operating the valve mechanism 49. The free end of the handle 101 curves upwardly into proximity to the steering wheel and has its free end widened as at 104 to form a finger engaging portion beneath which is arranged a depending flange 105 (Figures 14 and 15).

The portion of the recess 102 above the tubular member 99 is formed substantially cylindrical as at 106 (Figures 14 and 16) to receive a ball 107 formed on the upper end of a rod 108. It will be apparent that when the handle 101 is moved upwardly and downwardly toward and away from the steering wheel 11 it will rock about the pivot 103 to slide the rod 108 axially with respect to the tubular member 99, the arrangement of the ball 107 in the cylindrical recess 106 permitting this recess to slide with respect to the ball 107 to compensate for the swinging movement of the handle 101. Sliding movement of the rod 108 is utilized in a manner to be described to operate the shift rail selecting shaft 22.

Referring to Figures 12 and 13, the numeral 109 designates a supporting bracket arranged adjacent the lower end of the steering column and comprising a pair of semi-cylindrical complementary members 110 and 111 embracing and secured to the steering column as at 112. The member 110 carries an upwardly projecting boss 113 to which is connected a pivot pin 114. This pin supports a bell crank lever 115 having one arm 116 substantially vertically arranged and its other arm 117 extending substantially at right angles to the steering column. The arm 116 has its free end forked as at 118 to straddle the lower end of the rod 108, the forked portions of the bell crank lever being substantially cylindrical for reception between annular flanges 119 carried by the lower end of the rod 108. It will be apparent that axial sliding movement of the rod 108 will rock the bell crank lever 115 about its pivot 114, thus swinging the lower arm 116 of the bell crank lever. A spring 119' urges the rod 108 upwardly for a purpose to be described.

A link 120 has one end pivotally connected as at 121 to the lower end of the bell crank lever arm 116. The opposite end of the link 120 is pivotally connected as at 122 to the crank 23. Accordingly it will be apparent that swinging movement of the bell crank lever arm 116 swings the crank 23 whereby the selecting shaft 22 (Figure 7) may be selectively turned to either of its two operative positions.

The supporting bracket 109 also carries a lateral extension 123 in the free end of which is mounted a pivot pin 124. The member 123 extends horizontally to the right as viewed by the operator of the vehicle, and accordingly the pivot pin 124 is horizontally arranged. The extension 123 receives and supports the lower end of the tubular member 99. The pivot pin 124 supports a bell crank lever indicated by the numeral 125 and comprising an arm 126 lying substantially parallel to the steering column 10. The other arm 127 of the lever 125 is substantially vertically arranged as shown in Figure 1, attention being invited to the fact that Figure 13 is an elevation looking at right angles to the steering column from a position forwardly thereof.

The tubular member 99 is provided near its lower end with an arm 128 extending laterally with respect to the member 99 and to the right as viewed by the operator. The end of the arm 128 terminates in a ball 129, and the arm 126 of the bell crank lever 125 is forked as at 130 to receive the ball 129. It will be apparent that when the tubular member 99 is rocked on its axis by turning movement of the handle 101 parallel to the steering wheel 11, the arm 128 will turn about the axis of the tubular member 99 and swing the bell crank lever 125 about its pivot.

A drag link 131 is connected between the lower end of the bell crank arm 127 and the upper end of the floating lever 89. The connections between the link 131 and the elements referred to are respectively indicated by the numerals 132 and 133 and are preferably of the conventional adjustable ball and socket type.

In Figures 17, 18 and 19 a modified form of operating handle and associated parts is shown. A support indicated as a whole by the numeral 134 comprises a sleeve portion 135 surrounding and secured to the steering column adjacent the upper end thereof. The support further includes a substantially segmental housing 136 extending laterally from the steering column and to the right as viewed by the operator. The arcuate outer end of the housing 136 is provided with a circumferentially elongated opening 137 through which the inner end of a handle member 138 extends. The width of the slot 137 is only slightly greater than the thickness of the handle 138, as shown in Figure 17.

Within the housing 136, the handle 138 is provided with a roller 139, the diameter of which is approximately equal to the space between the upper and lower walls of the housing 136, and the peripheral surface of the wheel 139 is transversely curved as shown. The inner end of the handle 138 is forked as shown in Figure 19 for pivotal connection as at 140 to the upper end of a rod 141 extending through a bearing 145 formed in the bottom of the housing 136. Upon movement of the handle 138 parallel to the steering wheel 11, the rod 141 will be rocked to operate the valve mechanism 49. Upon movement of the handle 38 toward and away from the steering wheel 11, the roller 139 acts as a fulcrum to permit the pivot 140 to transmit axial movement to the rod 141. During such movement, the roller 139 is adapted to slide over the surface in which it is in engagement to permit the pivot pin 140 to partake of linear movement in alignment with the axis of the rod 141.

The free end of the handle 138 is shaped similar to the handle 101, the free end being widened as at 146 and provided with a depending finger engaging flange 147 similar to the flange 105 previously described.

The lower end of the rod 141 is provided with means for operating both of the bell crank levers 115 and 125. In the previously described form of the invention sliding movement of the rod 108 operates the bell crank lever 115 while rocking movement of the tubular member 99 swings the bell crank lever 125. In the form of the invention shown in Figure 17, the single rod 141 partakes of both movements, the rod sliding to rock the bell crank lever 115, and rocking to swing the lever 125. For this purpose the rod 141 is provided at its lower end with spaced annular flanges 146 to receive the fork 118 of the lever 115. Above the flanges 146, the rod 141 is provided with an arm 147 which occupies the same position as the arm 128, and is provided with a ball 148 adapted to be received within the fork 130. In view of the limited sliding movement of the rod 141, the forks 130 amply take care of movement of the ball 148 incident to axial sliding movement of the rod 141.

Neither of the forms of the invention shown in Figures 14 to 19 inclusive need be provided with means for guiding the handles 101 or 138 in the substantially H-shaped path in which they are adapted to move. The reason for this will be referred to later. However, such means may be included, if desired, and has been illustrated in the form of the invention shown in Figures 17 and 18.

The inner end of the handle 138 may be provided with a lug 150 which operates across the top of an arcuate lug 151 when the handle 138 is in the position shown in Figure 7 for shifting between second and high gears. When the handle 138 is in the neutral position shown in Figure 18 it may be moved upwardly for selecting the low and reverse gear shift rail for operation, the lug 151 being provided with a central notch 152 through which the lug 151 moves under such conditions. It will be apparent that unless the handle 138 is in the neutral position shown in Figure 18 it cannot be moved up and down toward and away from the steering wheel 11 to select a different shift rail for operation since the lug 150 will contact with one of the end portions of the lug 151 to prevent the movement of the handle 138 referred to.

The operation of the form of the apparatus shown in Figures 1 to 16, inclusive, is as follows:

Assuming that the shift rods, the valve 52 and the handle 101 are in neutral position, the operator may shift into low gear by lifting upwardly on the handle 101 and then moving such handle rearwardly parallel to the plane of the steering wheel 11. Upward movement of the handle 101 moves the rod 108 downwardly, thus swinging the bell crank lever 115 in a clockwise direction as viewed in Figure 1. Accordingly, the lever arm 116 will move forwardly or to the left as viewed in Figure 1 to pull the link 120 and thus rotate the crank 23 in a clockwise direction as viewed in Figures 1 and 12. Under such conditions, the selecting shaft 22 will be turned to the position shown in Figure 7 with the ball 45 engaging a cylindrical portion of the shaft 22 and locked in engagement with the groove 43. At the same time, the shaft 22 will occupy a position in which the recess 47 is arranged to receive the ball 44, and when movement is transmitted to the low and reverse gear shift rail 14, the walls of the groove 42 will cam the ball 44 upwardly into the recess 47, the shift rail 14 thus being free to move upon actuation of the motor 36 in a manner to be described, as shown in Figure 10.

With the handle 101 pulled upwardly to accomplish selection of the low and reverse gear shift rail, the handle may be pulled downwardly and rearwardly in a plane parallel to the steering wheel 11 to effect movement of the shift rail 14 into low gear position. Such movement of the handle 101 rocks the tubular member 99 on its axis to turn the arm 128 and thus transmit movement to the bell crank lever 125 to turn it in a clockwise direction as viewed in Figure 1. Accordingly, the lever arm 127 will move forwardly or to the left as viewed in Figure 1 to pull the drag link 131 forwardly and transmit forward movement to the upper end of the floating lever 89.

Inasmuch as the piston 37 of the motor 35 will have pressures on opposite sides thereof balanced when rearward movement of the handle 101 is started, the actuating shaft 29 (Figures 1 and 6) will remain stationary when the upper end of the floating lever 89 is moved forwardly, and accordingly the lower end of this lever will be moved rearwardly to transmit similar movement to the valve 52.

Referring to Figures 2 and 3, it will be noted that initial movement of the valve 52 rearwardly or to the right will cause the valve head 54 to close the previous slight communication between the space 55 and the port 69 while the valve head 53 will move to the right to increase the degree of communication between the space 55 and the port 68. Moreover, the slight movement of the valve 52 referred to will cause the tapered end of the valve head 54 to move to the right sufficiently to establish communication between the port 69 and the space 62, which is always in communication with the atmosphere through port 64, manifold 65 and port 66.

Movement of the valve 52 in the manner described accordingly maintains communication between the pipe 72 and the forward end of the cylinder 36 with the intake manifold, the space 55 being in constant communication with the intake manifold through pipe 58 as previously stated. Moreover, the movement of the valve in the manner described connects the pipes 73 and the rear end of the cylinder 36 to the atmosphere, and accordingly the piston 37 will start to move.

Inasmuch as the rear end of the cylinder 36 will be connected to the atmosphere, the piston 37 (Figure 8) will start to move forwardly, thus rocking the shaft 29 and crank 33, the latter engaging the whiffletree 16 to tend to move it forwardly. Since the second and high gear shift rail 15 will be locked as shown in Figure 7, the pin 19 (Figure 6) will prevent movement of the corresponding end of the whiffletree, and accordingly such element will pivot about the pin 19. Thus the end of the whiffletree adjacent the pin 18 will be free to move, and movement will be transmitted by the whiffletree to the low and reverse gear shift rail 14 to move it forwardly toward low gear position.

Assuming that the operator moves the handle 101 rearwardly a short distance from neutral position and then stops movement of the handle 101, no further movement will be transmitted to the upper end of the floating lever 89. However, operation of the motor 35 in the manner described will turn the shaft 29 in a clockwise direction as viewed in Figure 1, thus causing the crank 31 to move the pivot 90 forwardly. With the pivot connection 133 stationary, forward movement of the center of the floating lever 89 will transmit similar movement to the valve 52. Whereas this valve will have been previously moved rearwardly upon operation of the handle 101, movement of the piston 37 will now move the valve 52 forwardly to return it to the neutral position shown in Figure 2. When such position is reached, the port 69 will be disconnected from the atmosphere and restricted communication will be established between the port 69 and the vacuum space 55, thus exhausting air from the rear end of the cylinder 35 to vacuum suspend the piston 37. As previously stated, both of the ports 68 and 69 are connected to the source of vacuum when the valve 52 is in neutral position due to the fact that the space between the inner faces of the valve heads 53 and 54 are slightly greater than the space between the adjacent limits of the ports 68 and 69. Accordingly, if the handle 101 is moved a short distance and then stopped, the piston 37 of the shifting motor will move a proportionate distance and then will be arrested by returning the valve 52 to neutral position.

The foregoing operation is pointed out to make it clear that movement of the piston 37 is always proportionate to the movement of the handle 101, a follow-up action being provided together with the feature of vacuum suspending the motor piston 37 whenever movement of the handle 101 is stopped, regardless of the position of the handle. Ordinarily, of course, the operator will move the handle 101 continuously from neutral to the low gear position under the conditions being considered. Such continuous movement will transmit proportionate continuous movement to the connection 133 to move the upper end of the floating lever 89 forwardly. However, such operation will cause the valve 52 to be held in a position to the right of the position shown in Figure 2 to maintain communication between the atmosphere and the rear end of the cylinder 36, thus continuing the swinging movement of the actuating shaft 29. Such movement is transmitted to the selected shift rail to actuate it and is also transmitted through the lever 31 to the pivot 90 to move the center of the floating lever forwardly to compensate for the forward movement of the link 131.

The parts are proportioned so that the degree of movement of the pivot 90 will almost exactly compensate for the movement of the link 131 in which case the valve 52 will remain stationary in the operative position referred to to supply air to the rear end of the cylinder 36. When the low gear position of the handle 101 is reached, movement of this handle will stop, thus arresting forward movement of the upper end of the lever 89. The piston 37 then moves a very slight additional distance forwardly to move the pivot 90 while the upper end of the floating lever 39 remains stationary, and such operation will return the valve 52 to neutral position to arrest movement of the motor piston 37 and vacuum suspend it ready for the next operation.

After the vehicle has attained the desired momentum in low gear, the operator may depress the vehicle clutch pedal, whereupon the shift may be made into second gear. The characteristics of the apparatus are such that shifting of the handle 101 from low into second gear requires only the use of one finger by the operator. The handle 101 may be moved forwardly from the low gear position to neutral position, whereupon the biasing means for the rod 108, such as the spring 119' will move the handle 101 to its lower position to select the second and high gear shift rail, whereupon the handle 101 may be moved upwardly and forwardly to the second gear position.

Forward and upward movement of the handle 101 out of low gear position reverses the previously described operation of the link 131 (Figure 1), this link being moved rearwardly to transmit similar movement to the upper end of the lever 89 whereupon the lower end of this lever will move the valve 52 forwardly. Under such conditions, the valve head 53 will close communication between the port 68 and the vacuum space 55 and open communication between the port 68 and the air space 61. At the same time, the valve head 54 will move to uncover the port 69 to a slightly greater degree of communication with the vacuum space 55.

Since the piston 37 of the motor will have been vacuum suspended in the low gear position, the increased opening of the port 69 to the vacuum space 55 will have no effect on the rear end of the cylinder 36, such end of the cylinder being maintained in communication with the source of vacuum. However, movement of the valve head 53 will admit air into the port 68 and accordingly into the forward end of the cylinder 36, whereupon the piston 37 will start to move rearwardly. Since the second and high gear shift rail 15 will remain locked as shown in Figure 7, the whiffletree lever 16 will again pivot about the pin 19 and the other end of the lever 16 will transmit movement to the low and reverse gear shift rail 14 to return it to neutral position.

The rocking movement of the shaft 29 for returning the shift rail 14 to normal position takes place in a counterclockwise direction as viewed in Figure 1, and accordingly the crank 31 will move the pivot 90 rearwardly to compensate for the rearward movement of the link 131 and thus hold the valve 52 in the operative position described, namely, slightly to the left of the position shown in Figure 2. When the neutral position is reached, forward and upward movement of the handle 101 will be arrested pending the selection of the second and high gear shift rail. Accordingly, movement of the upper end of the floating lever 89 will be stopped and very slight continued movement of the motor piston 37 and crank 31 will move the valve 52 to the right as viewed in Figure 2 and thus return it to neutral position. The piston of the shifting motor will be immediately vacuum suspended as will be apparent.

As previously stated, the spring 119' (Figure 13) biases the handle 101 to the position in which the second and high gear shift rail will be selected for operation, the biasing means tending to swing the bell crank lever 115 in a counterclockwise direction as viewed in Figure 1. The biasing means is incapable of functioning except when both shift rails are in neutral position since the selecting shaft 22 (Figure 7) is not free to move unless both of the shift rail grooves 42 and 43 are in registration with the openings 46 to receive the locking balls.

Accordingly, it will be apparent that when neutral position is reached after shifting out of low gear, the biasing means referred to will transmit movement through the bell crank lever 115, link 120 and crank 23 to turn the selecting shaft 22 in a counter-clockwise direction as viewed in Figures 1, 9 and 10, and thus the shaft 22 will be rotated to turn the recess 47 out of registration with the ball 44 to lock the latter in its groove 42. At the same time, the recess 48 will be moved from the position shown in Figure 7 to a position above and in registration with the ball 45. Under such conditions, the low and reverse gear shift rail 14 will be positively locked against movement, while movement may be transmitted to the shift rail 15 to cam the ball 45 upwardly into the recess 48.

The handle 101 is now in a position to be moved forwardly to cause movement of the shift rail 15 into second gear position. So far as the valve 52 and motor 55 are concerned, the operations are the same as in the movement of the handle from low gear to the neutral position, the piston 37 moving rearwardly or to the right as viewed in Figure 8 to move the crank 33 in the same direction. Whereas the whiffletree previously fulcrumed about the pin 19, the locking of the low and reverse gear shift rail 14 will cause the lever 16 to fulcrum about the pin 18 whereupon the right hand end of the lever 16 as viewed in Figure 6 will transmit movement to the shift rail 15 to move the latter into second gear position. When such position is reached movement of the handle 101 will be arrested, whereupon the valve 52 will be returned to normal position to vacuum suspend the motor piston 37, this operation being the same as that previously described when the handle 101 is moved from low gear position to neutral position and then stopped.

After proper acceleration of the vehicle has taken place in second gear, the vehicle clutch is again disengaged, whereupon the operator may move the handle 101 directly from the second gear to the high gear position. There will be no change in the selection of the shift rails as will be obvious, and the biasing spring 119' will hold the handle 101 in the proper plane of movement. Without removing his hand from the steering wheel, the operator may use one finger to move the handle 101 from second to high gear. This movement may take place continuously without stopping in neutral position since the shift from second to high gear is accomplished by moving only the shift rail 15.

The shift into reverse may be made when the handle 101 is in neutral position by moving the handle upwardly to the low and reverse gear plane of movement to select the rail 14 for operation, and then moving the handle 101 upwardly and forwardly in the plane of movement referred to. Under such conditions, it will be apparent that the selection of the shift rail 14 for operation will take place in the same manner as previously described for the shift into low gear. The upward and forward movement of the handle 101, however, will cause the shift rail 14 to move in the direction opposite to that previously described for low gear, the shift rail 15 being locked whereby the whiffletree lever will pivot about the pin 19.

The present construction provides the handle 101 with the highly desirable "feel" which is described and claimed in the application of Henry W. Hey, Serial No. 169,288, referred to above. It will be apparent that when the valve 52 is moved to the right of the position shown in Figure 2, the port 68 will be opened to communication with the source of vacuum while the port 69 will be opened to the atmosphere, thus resulting in forward movement of the motor piston 37.

The establishment of differential pressure on opposite sides of the motor piston is duplicated on opposite sides of the diaphragm 75, the chamber 76 being connected to the port 68 and hence the forward end of the cylinder 36 through the port 84 and the chamber 78 being connected to port 69 and hence the lower end of the cylinder 36 through passages 87 and 86. Thus, when the valve 52 is moved to the right, as viewed in Figure 2, differential pressure will be established on opposite sides of the diaphragm 75 to tend to move the valve 52 to the left, thus resisting the manual movement of the valve 52. This resistance is transmitted through the connections between the valve 52 and the handle 101, and the operator accordingly feels a resistance to the movement of the handle 101 which is proportionate to the differential pressure in the motor 35.

The differential pressure established on opposite sides of the motor piston 36, and likewise on opposite sides of the diaphragm 75, will depend upon resistance encountered by the piston 37 in effecting movement of the selected shift rail. For example, during the portions of the gear shift operation when resistance to the movement of the motor piston is very slight, the piston 37 will move freely under the influence of slight differential pressures, and since the same differential pressures affect the diaphragm 75, the operator will feel only a slight resistance to the movement of the handle 101.

When a gear shift movement is resisted to an increasing extent, for example, when the gear synchronizing means of the transmission comes into operation, a slight differential pressure will be insufficient to continue to effect relatively free movement of the motor piston 37, and movement of this piston accordingly will be retarded. The admission of air to one end of the cylinder 36 and the exhausting of air from the opposite end accordingly increases the differential pressures affecting the piston 37. Moreover, the retarding of the movement of the piston likewise retards the follow-up action transmitted to the valve 52 through the crank 31, thus increasing the effective areas of the ports 68 and 69 to tend more rapidly to increase differential pressures in the cylinder 36. The extreme sensitivity of the apparatus is such that differential pressures vary substantially instantaneously upon variations in resistance encountered by the piston 37. Moreover, such variations in differential pressures are immediately communicated to the diaphragm chambers 76 and 78, thus varying the resistance encountered by the operator in moving the handle 101.

Accordingly, it will be apparent that while the operator may move the handle 101 under any conditions without the exercise of substantial force, the "feel" feature enables the operator to feel his way into gear in the same manner as has been ordinarily accomplished by the operation of a conventional gear shift lever. This feature is particularly advantageous in connection with transmissions having gear synchronizing means, since it enables the operator to properly retard the speed of a shifting operation to permit the gear synchronizing means to properly function.

The disks 83 (Figure 2) operate to limit the movement of the valve 52 with respect to the valve casing 50. The lost motion thus provided is never taken up during the normal operation of the apparatus because of the extreme rapidity of operation which is inherent in the apparatus. However, the limiting of the movement of the valve 52 permits the gear shifting operation to take place manually in the event of failure of power in the shifting motor. Assuming that the operator desires to shift into low gear and the motor 35 fails to function, the rearward movement of the handle 101 in the low gear plane of movement moves the valve 52 rearwardly in the manner previously described by pulling forwardly on the connection 133, the floating lever 89 fulcruming on the pivot 90. When the valve 52 reaches its limit of movement, further rearward movement of the pivot pin 91 is prevented, whereupon continued forward movement of the link 131 will pull the upper end of the floating lever 39 forwardly and will turn the crank 31 in a clockwise direction as viewed in Figure 1. This operation will have the same effect as the previously described low gear shifting operation, the rocking of the shaft 29 moving the shift rail 15 into low gear position.

In a similar manner, any gear position may be manually effected in the event of power failure. Of course, the manual shifting operation requires the application of more force to the handle 101, but the operation may be accomplished without difficulty. Since no power source is required under any conditions for selecting either shift rail for actuation, the function of selecting the shift rails will be accomplished in the same manner regardless of whether the motor 35 is functioning.

Particular attention is invited to the fact that the amount of force required for selecting the shift rails for actuation, is substantially negligible. The balls 44 and 45 are not biased for movement in any direction and tend to fall by gravity into their associated grooves 42 and 43. If, due to the presence of heavy lubricant, the balls 44 and 45 fail to drop into their respective grooves by gravity, the turning of the shaft 22 will accomplish this function without requiring the application of a noticeable amount of force. The shift rail selecting operation is accomplished without the necessity for introducing any substantial amount of resistance between the handle 101 and the locking balls 44 and 45, and accordingly the operator may move the handle 101 between the low and reverse gear plane and the second and high gear plane without the use of any substantial force.

The highly advantageous feature referred to permits a single handle to be employed for effecting the manual operation of the shift rail selecting means and for effecting operation of the valve mechanism which controls the shifting motor. It also permits the use of a relatively simple motion transmitting means between the handle 101 and the parts controlled thereby, and such motion transmitting means may be made of very light parts. Accordingly, it is wholly practicable to mount the handle 101 adjacent the steering wheel 11, and such mounting does not require the use of heavy and unsightly parts adjacent the steering wheel and steering column.

The various operations above described may be carried out with the control mechanism shown in Figures 17, 18 and 19, and such operations need not be repeated in detail. Instead of employing the rocking tube 99 and the sliding rod 108, the form of the invention shown in Figures 17, 18 and 19 permits these parts to be combined in a single rod which rocks to operate the valve mechanism 49 and slides axially to select the shift rails for operation.

In the use of the modified form of the invention, the ball 148 engages the fork 130 of the bell crank lever 125 to transmit movement to the latter in the same manner as in the form of the invention previously described. Likewise, the flanges 146 receive therebetween the circular forked end 118 of the bell crank lever 115 to rock the latter upon sliding movement of the rod 141. During swinging movement of the handle 147 parallel to the plane of the steering wheel 11, the roller 139 rolls against one surface of the casing 136 while turning the rod 141 on its axis to operate the bell crank lever 125. Upon movement of the handle 138 toward and away from the steering wheel for the shift rail selecting operation, the roller 139 acts as means for fulcruming the handle 138, thus permitting the transmission of axial sliding movement to the rod 141.

While the means within the transmission housing and cover for selecting and actuating the shift rails corresponds generally to the corresponding means described and claimed in my copending application Serial No. 161,318 referred to above, the present construction has several highly advantageous features. For example, the earlier construction involves the use of a crank shaft carried by the transmission casing, which is connected to the whiffletree lever by two elements, namely, a crank and a link, whereas the crank shaft 29 of the present construction is carried by the cover plate and has a single crank member 33 rigid therewith and directly engaging the whiffletree lever. Accordingly, the present construction is simplified and requires no alteration in the conventional transmission housing.

Moreover, the shaft 29 may be adequately supported in long bearings to greatly minimize wear, and the arrangement of the shaft is such as to render the mechanism highly flexible for use in different motor cars. In the form of the invention shown in Figures 1 and 6, the motor 35 and valve mechanism are arranged on opposite sides of the transmission. By lengthening the shaft 29, however, both the motor and the valve mechanism may be mounted to one side of the transmission, and either side may be selected depending upon the particular motor car in which the apparatus is to be installed. In a similar manner, the selecting shaft 22 may project from either side of the transmission, depending upon the conditions present in any particular installation.

While the form of the invention in Figures 17, 18 and 19 has been shown in conjunction with means for predetermining an H-shaped path of movement of the handle 138 by means of the lugs 150 and 151 and the notch 152, such means need not be employed in either form of the invention. As previously pointed out, the selecting shaft 122 is locked against rocking movement except when both shift rails are in neutral position, one of the balls 44 or 45 being in its associated recess 47 or 48 if either shift rail is out of its neutral position. Accordingly, either type of operating handle can always be moved in the plane of movement in which it is arranged, but cannot be moved from one plane of movement to the other unless both shift rails are in neutral position, which can occur only if the manually operable handle is in its corresponding neutral position. Accordingly, the apparatus inherently provides an H-shaped path of movement for the manually operable handle.

Inasmuch as motion is transmitted to the whiffletree lever intermediate its length while one of the levers is fulcrumed, the other end of the lever partakes of substantially greater movement than the crank 33. This fact, together with other features of construction, facilitates the placing of the actuating shaft 29 above and parallel to the plane of the whiffletree lever and in relatively close proximity thereto, only a very short crank arm 33 being required. Moreover, the opening 34 for the crank 33 may be placed at any desired position between the ends of the lever 16. In the construction illustrated, it may be assumed that only the second and high gear elements of the transmission are provided with gear synchronizing means and accordingly the distance of movement of the shift rail 15 in either direction from its neutral position is shorter than the distance of movement which must be transmitted to the low and reverse gear shift rail 14. Accordingly, the crank arm 33 engages the whiffletree lever closer to the pin 19 than to the pin 18 to provide the desired differential movements of the two shift rails.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. The combination with a transmission having a plurality of members shiftable for providing different gear ratios, of floating lever means connected to actuate any of said shiftable members, means for selecting said shiftable members for actuation by said lever means, and an actuating shaft arranged parallel to the plane of said lever means and having a crank directly engaged therewith to actuate said lever means upon the rocking of said shaft, said selecting means being constructed and arranged to be operable wholly independently of said shaft.

2. The combination with a transmission having a plurality of members shiftable for providing different gear ratios, of floating lever means connected to apply a force to all of said shiftable members, selecting means for rendering said lever means effective for moving only one of said shiftable members whereby the latter shiftable member will be moved upon actuation of said lever means, an actuating shaft arranged parallel to the plane of said lever means, and a crank carried by said rock shaft and directly engaging said lever means to actuate the latter upon the rocking of said shaft, said selecting means being constructed and arranged to be operable wholly independently of said shaft.

3. The combination with a transmission having a casing and a pair of members shiftable for providing different gear ratios, of a cover plate for said casing, a floating lever having connection at its ends with the respective shiftable members, a rock shaft journaled in said cover plate and having a crank fixed thereto and directly engaging said lever between said connections, and means constructed and so arranged to be operable wholly independently of said shaft for rendering either end of said lever relatively immovable whereby the actuation of said lever will move the other end thereof and effect movement of the associated shiftable member.

4. The combination with a transmission having a casing and a pair of members shiftable for providing different gear ratios, of a cover plate for said casing, a floating lever having connection at its ends with the respective shiftable members, a rock shaft journaled in said cover plate and having a crank fixed thereto and directly engaging said lever between said connections, and means constructed and arranged to be operable wholly independently of said shaft and connected to be selectively locked in operative position for rendering either end of said lever relatively immovable whereby the actuation of said lever by said crank will move the other end of said lever and effect movement of the associated shiftable member.

5. The combination with a transmission having a casing and a pair of members shiftable for providing different gear ratios, of a cover plate for said casing, a floating lever having connection at its ends with the respective shiftable members, a rock shaft journaled in said cover plate and having a crank fixed thereto and directly engaging said lever between said connections, a second rock shaft, and means controlled by the operation of said last named shaft for rendering either end of said lever relatively immovable whereby the actuation of said lever by said crank will move the other end of said lever and effect movement of the associated shiftable member.

6. The combination with a transmission having a casing and a pair of members shiftable for providing different gear ratios, of a cover plate for said casing, a floating lever having connection at its ends with the respective shiftable members, a bearing formed in said cover plate parallel to the plane of said lever, a rock shaft mounted in said bearing, an actuating crank carried by said shaft and engaging said lever intermediate its ends, a force-applying crank connected to one end of said shaft, said bearing extending from side to side of said cover plate whereby said last named crank may be connected to either end of said shaft, and means constructed and arranged to be operable wholly independently of said shaft for rendering said lever ineffective for transmitting movement to either of said shiftable members whereby actuation of said lever by said crank will effect movement of the other shiftable member.

7. The combination with a transmission having a casing and a pair of members shiftable for providing different gear ratios, of a cover plate for said casing, a floating lever having connection at its ends with the respective shiftable members, a bearing formed in said cover plate parallel to the plane of said lever, a rock shaft mounted in said bearing, an actuating crank carried by said shaft and engaging said lever intermediate its ends, a force-applying crank connected to one end of said shaft, said bearing extending from side to side of said cover plate whereby said last named crank may be connected to either end of said shaft, and means constructed and arranged to be operable wholly independently of said shaft and connected to selectively lock either shiftable member against movement whereby the corresponding connection of said lever will be rendered relatively immovable and actuation of said lever by said crank will effect movement of the other shiftable member.

8. The combination with a transmission having a pair of members shiftable for providing different gear ratios, of a floating lever having connection at its ends with the respective shiftable members, motor means for applying a force to said lever intermediate its ends to tend to move both shiftable members, a control mechanism for said motor means, a handle connected to partake of one movement to render either end of said lever relatively immovable whereby the application of said force will move the other end of said lever and effect movement of the associated shiftable member, said handle being connected to partake of another movement to operate said control mechanism, and means for supporting said handle for said two movements.

9. The combination with a transmission having a pair of members shiftable for providing different gear ratios, of a floating lever having connection at its ends with the respective shiftable members, motor means for applying a force to said lever intermediate its ends to tend to move both shiftable members, a control mechanism for said motor means, selecting means connected for rendering either end of said lever relatively immovable whereby the application of said force will move the other end of said lever and effect movement of the associated shiftable member, a common control handle connected to partake of one movement to operate said selecting means and connected to partake of another movement to operate said control mechanism, and means for supporting said handle for said two movements.

10. The combination with a transmission having a pair of members shiftable for providing different gear ratios, of a floating lever having connection at its ends with the respective shiftable members, motor means for applying a force to said lever intermediate its ends to tend to move both shiftable members, a control mechanism for said motor means, a common control handle, means connected for utilizing one movement of said handle for manually rendering one end of said lever relatively immovable whereby the application of said force will move the other end of said lever and effect movement of the associated shiftable member, means connected for utilizing another movement of said handle for operating said control mechanism, and means for supporting said handle for said two movements.

11. The combination with a transmission having a pair of members shiftable for providing different gear ratios, of a floating lever having connection at its ends with the respective shiftable members, motor means for applying a force to said lever intermediate its ends, a control mechanism for said motor means, a rock shaft, means connected to be operated by said rock shaft for rendering either end of said lever relatively immovable whereby the application of said force will move the other end of said lever and effect movement of the associated shiftable member, a common control handle connected to partake of one movement to rock said shaft and connected to partake of another movement to operate said control mechanism, and means for supporting said handle for said two movements.

12. The combination with a transmission having a pair of members shiftable for providing different gear ratios, of a floating lever having connection at its ends with the respective shiftable members, motor means for applying a force to said lever intermediate its ends, a control mechanism for said motor means, a rock shaft, a pair of locking elements connected to be selectively locked in operative position by the rocking of said shaft for rendering either end of said lever relatively immovable whereby the application of said force will move the other end of said lever and effect movement of the associated shiftable member, a common control handle connected to partake of one movement for rocking said shaft and connected to partake of another movement for operating said control mechanism, and means for supporting said handle for said two movements.

13. The combination with a transmission having a pair of members shiftable for providing different gear ratios, of a floating lever having connection at its ends with the respective shiftable members, motor means for applying a force to said lever intermediate its ends, a control mechanism for said motor means, means connected to selectively render either end of said lever relatively immovable whereby the application of said force will move the other end of said lever and effect movement of the associated shiftable member, a common control handle mounted to turn on either of two axes, means connected for utilizing turning movement of said handle on one axis for operating said last named means, and means connected for utilizing turning movement of said handle on the other axis for operating said control mechanism.

14. The combination with a transmission having a plurality of members shiftable for providing different gear ratios, of motor means having motion transmitting means to transmit a force operable for moving any of said shiftable members, a control mechanism for said motor means, a manually operable mechanism having a portion axially movable and a second portion adapted to turn about the same axis, means constructed and arranged to be operative wholly independently of said motor means and said motion transmitting means for utilizing movement of one of said portions for rendering said motor means operative for moving only one of said shiftable members, and means for utilizing movement of the other portion of said manually operable mechanism for operating said control mechanism.

15. The combination with a transmission having a plurality of members shiftable for providing different gear ratios, of motor means having motion transmitting means to transmit a force operable for moving any of said shiftable members, a control mechanism for said motor means, a rock shaft mounted to be turned selectively to a plurality of operative positions, means connected for operation by said rock shaft for rendering said motor means operative for moving only one selected shiftable member in each operative position of said shaft, a manually operable mechanism having a portion axially movable and a second portion mounted to turn on the same axis, means for utilizing movement of one of said portions for rocking said shaft, and means for utilizing movement of the other portion of said manually operable mechanism for operating said control mechanism, said selecting means being constructed and arranged to be operated by said rock shaft wholly independently of said motor means and said motion transmitting means.

16. The combination with a motor vehicle having a steering wheel and steering column, and a transmission having a plurality of members shiftable for providing different gear ratios, of motor means having motion transmitting means to transmit force operable for moving any of said shiftable members, a control mechanism for said motor means, a manually operable mechanism arranged adjacent and parallel to said steering column, an operating handle for said manually operable means mounted to partake of two movements, said manually operable mechanism having a portion axially movable upon one movement of said handle and a second portion adapted to turn about the same axis upon the other movement of said handle, means constructed and arranged to be operative wholly independently of said motor means and said motion transmitting means for utilizing movement of one of said portions for rendering said motor means operative for moving only one of said shiftable members, and means connecting the other portion of said manually operable mechanism to said control mechanism to operate the latter.

17. The combination with a motor vehicle having a steering wheel and steering column, and a transmission having a plurality of members shiftable for providing different gear ratios, of motor means, motion transmitting means connected to said motor means to transmit therefrom forces operable for moving all of said shiftable members, a control mechanism for said motor means, a rock shaft mounted to turn to either of a plurality of operative positions, means operable by said rock shaft in each of its operative positions for rendering said motor means operative for moving only one of said shiftable members, said last named means being operable wholly independently of said motion transmitting means, a manually operable mechanism mounted parallel to said steering column, a handle for said manually operable mechanism arranged adjacent the steering wheel and mounted to partake of two movements, said manually operable mechanism having a portion axially movable upon one movement of said handle and having a second portion mounted to turn on the same axis upon the other movement of said handle, means connecting one of such portions to said rock shaft to selectively turn it to its operative positions, and means connecting the other portion of said manually operable mechanism to said control mechanism to operate the latter.

18. The combination with a transmission having elements selectively shiftable to provide different gear ratios, of actuating means connected to apply a force tending to shift said elements, selecting devices including rotary means turnable to different angular positions and having corresponding angularly spaced operative portions constructed and arranged with respect to other portions of said rotary means for selectively rendering said actuating means effective upon operation thereof for providing a selected gear ration as predetermined by the angular position of said rotary means, a common operating handle, means for supporting said handle for different movements, and means connected for utilizing the respective different movements of said handle to operate said rotary means and to control said actuating means.

19. The combination with a transmission having elements selectively shiftable to provide different gear ratios, of motor means connected to apply a force tending to shift said elements, a control mechanism connected to control said motor means, selecting devices including rotary means turnable to different angular positions and having corresponding angularly spaced operative portions constructed and arranged with respect to other portions of said rotary means for selectively rendering said motor means effective upon operation thereof for providing a selected gear ratio as predetermined by the angular position of said rotary means, a common operating handle, means for supporting said handle for different movements, and means connected for utilizing the respective different movements of said handle to rotate said rotary means and to operate said control mechanism.

20. The combination with a transmission having elements selectively shiftable to provide different gear ratios, of motor means connected to apply a force tending to shift said elements, control mechanism connected to control said motor means, selecting devices including rotary means turnable to different angular positions and having corresponding angularly spaced operative portions constructed and arranged with respect to other portions of said rotary means for selectively releasing and locking the respective transmission elements to render said motor means effective upon operation thereof for providing a desired gear ratio, a common operating handle, motion transmitting means connected between said handle and said rotary means to rotate the latter upon a given movement of said handle, and a second motion transmitting means connected to transmit a different movement of said handle to said control mechanism to operate the latter.

21. The combination with a transmission having elements selectively shiftable to provide different gear ratios, of actuating means connected to apply a force tending to shift said elements, selecting means including a single rotary member connected to control all of said elements, said rotary member being turnable to different angular positions and having corresponding angularly spaced operative portions constructed and arranged with respect to other portions of said rotary member for selectively rendering said actuating means effective upon operation thereof for providing a selected gear ratio as predetermined by the angular position of said rotary member, a common operating handle, means for supporting said handle for different movements, and means connected for utilizing the respective different movements of said handle to rotate said rotary member and to control said actuating means.

22. The combination with a transmission having elements selectively shiftable to provide different gear ratios, of motor means connected to apply a force tending to shift said elements, control mechanism connected to control said motor, selecting means including a single rotary member connected to control all of said shiftable elements, said rotary member being turnable to different angular positions and having corresponding angularly spaced operative portions constructed and arranged with respect to other portions of said rotary member for selectively rendering said actuating means effective upon operation thereof for providing a selected gear ratio as predetermined by the angular position of said rotary member, a common operating handle, means for supporting said handle for different movements, and means connected for utilizing the respective different movements of said handle to rotate said rotary member and to operate said control mechanism.

23. The combination with a transmission having elements selectively shiftable to provide different gear ratios, of actuating means comprising a single actuating member connected to apply a force tending to simultaneously move all of said elements, selecting means including a single rotary member turnable to different angular positions and having corresponding angularly spaced operative portions constructed and arranged with respect to other portions of said rotary member for selectively rendering said actuating member effective upon operation thereof for providing a selected gear ratio as predetermined by the angular position of said rotary member, a common operating handle, means for supporting said handle for different movements, and means connected for utilizing the respective different movements of said handle to control said actuating member and to rotate said rotary member.

24. The combination with a transmission having portions selectively shiftable to provide different gear ratios, of actuating means comprising a single actuating member connected to apply a force tending to simultaneously move all of said elements, motor means connected to operate said actuating means, control mechanism connected to control said motor means, selecting devices including rotary means turnable to different angular positions and having corresponding angularly spaced operative portions constructed and arranged with respect to other portions of said rotary means for selectively rendering said actuating member effective upon operation thereof for providing a selected gear ratio as predetermined by the angular position of said rotary means, a common operating handle, means for supporting said handle for different movements, and means connected for utilizing the respective different movements of said handle to rotate said rotary means and to operate said control mechanism.

25. The combination with a transmission having elements selectively shiftable to provide different gear ratios, of actuating means comprising a single actuating member connected to apply a force tending to simultaneously move all of said elements, motor means connected to operate said actuating means, control mechanism connected to control said motor, selecting means comprising a single rotary member connected to control all of said shiftable elements, said rotary member being turnable to different angular positions and having corresponding angularly spaced operative portions constructed and arranged with respect to other portions of said rotary member for selectively rendering said actuating member effective upon operation thereof for providing a selected gear ratio as predetermined by the angular position of said rotary member, a common operating handle, means for supporting said handle for different movements, and means connected for utilizing the respective different movements of said handle to rotate said rotary member and to operate said control mechanism.

26. The combination with a transmission having elements selectively shiftable to provide different gear ratios, of actuating means and selecting means each comprising a rotary member, said rotary members being parallel to each other, the rotary member of said actuating means being connected to apply a force tending to simultaneously move all of said shiftable elements, the rotary member of said selecting means having angularly spaced portions constructed and arranged with respect to other portions thereof for rendering the rotary member of said actuating means effective for moving only one of said shiftable elements, and a common operating handle connected to transmit one movement thereof to the rotary member of said selecting means and connected to utilize another movement thereof for controlling said actuating means.

27. The combination with a transmission having elements selectively shiftable to provide different gear ratios, of actuating means and selecting means each comprising a rotary member, said rotary members being parallel to each other, the rotary member of said actuating means being connected to apply a force tending to simultaneously move all of said shiftable elements, the rotary member of said selecting means having angularly spaced portions constructed and arranged with respect to other portions thereof for rendering the rotary member of said actuating means effective for moving only one of said shiftable elements, the transmission including a housing from which both of said rotary members project, motor means connected to the projecting end of the rotary member of said actuating means to transmit a rocking movement thereto, and a common operating handle connected to control said motor means and connected to transmit movement to the projecting end of the rotary member of said selecting means to rock the latter rotary member.

28. The combination with a transmission having a casing and a pair of members shiftable for providing different gear ratios, of a cover plate forming part of said casing, a floating lever having connection at its ends with the respective shiftable members, a rock shaft journaled in said cover plate, an actuating member rigid with said rock shaft within said casing and having operative connection with said lever intermediate said connections, said actuating member and the portion of said lever engaged thereby being constructed and arranged to be bodily movable with said cover plate and means constructed and arranged to be operable wholly independently of said shaft for rendering either end of said lever relatively immovable whereby the actuation of said lever will move the other end thereof and effect movement of the associated shiftable member.

29. The combination with a transmission having a casing and a pair of members shiftable for providing different gear ratios, of a cover plate secured to said casing, a floating lever having connection at its ends with the respective shiftable members, a rock shaft journalled in said cover plate, an actuating member rigid with said rock shaft and having operative connection with said lever intermediate said connections, said actuating member and its connection with said lever being constructed and arranged to be operatively connected upon the attachment of said cover plate to said casing, and selecting means comprising a second rock shaft carried by said cover plate, means connected for actuation by said second rock shaft and connected and arranged to selectively render either end of said lever immovable whereby the actuation of said lever will move the other end thereof and effect movement of the associated shiftable member, said selecting means being connected and arranged with respect to said cover plate to be bodily movable therewith.

30. The combination with a transmission including a casing having a plurality of members shiftable for providing different gear ratios, of a pair of adjacent parallel rock shafts projecting from said casing and each provided with an operating crank externally of said casing, a floating lever within said casing connected at its ends to said shiftable members, means rigid with one shaft for directly transmitting a force to said lever intermediate its ends to tend to move both shiftable members, and means connected to be operated by the other shaft for rendering one end of said lever immovable whereby the other end of said lever will effect movement of its associated shiftable member.

31. The combination with a transmission including a casing having a plurality of members shiftable for providing different gear ratios, of a pair of adjacent parallel rock shafts projecting from said casing and each provided with an operating crank externally of said casing, a floating lever within said casing connected at its ends to said shiftable members, means rigid with one shaft for directly transmitting a force to said lever intermediate its ends to tend to move both shiftable members, and means connected for selective engagement with said shiftable members for rendering either member immovable whereby the other end of said lever will move its associated shiftable member, said last named means being connected to be directly operated by the other of said shafts.

32. The combination with a transmission having a plurality of members shiftable for providing different gear ratios, of motor means connected to transmit a force tending to move all of said shiftable members, a control mechanism for said motor means, selecting means connected for rendering said motor means operative upon actuation thereof for moving only one shiftable member, a common control handle mounted to turn on either of two axes, means connected for utilizing turning movement of said handle on one axis for operating said selecting means, and means connected for utilizing turning movement of said handle on the other axis for operating said control mechanism.

33. The combination with a transmission having a plurality of members shiftable for providing different gear ratios, of a floating lever having connection at its ends with the respective shiftable members, motor means connected for applying a force to said lever intermediate its ends to tend to move both shiftable members, a control mechanism for said motor means, a rock shaft mounted to be turned selectively to a plurality of operative positions, means connected for operation by said rock shaft for rendering said motor means operative upon actuation thereof for moving only one shiftable member in each position of said shaft, a manually operable mechanism axially movable and turnable on a predetermined axis, means for utilizing one such movement of said mechanism for rocking said shaft, and means for utilizing the other movement of said manually operable mechanism for operating said control mechanism.

34. The combination with a transmission having a pair of members shiftable for providing different gear ratios, of a floating lever having connection at its ends with the respective shiftable members, a rock shaft having a portion directly engageable with said lever intermediate its ends to tend to move both shiftable members upon the rocking of said shaft, a second rock shaft, means controlled by said second rock shaft for rendering either end of said lever immovable whereby the rocking of said first named shaft will move the other end of said lever and effect movement of the associated shiftable member, a common control handle mounted to turn on either of two axes, motion transmitting connections between said handle and said second rock shaft to manually rock the latter upon movement of said handle on one of said axes, and mechanism connected between said handle and said first named rock shaft for effecting rocking movement thereof upon turning movement of said handle on its other axis.

35. The combination with a transmission having a pair of members shiftable for providing different gear ratios, of a floating lever having connection at its ends with the respective shiftable members, motor means for applying force to said lever intermediate its ends to tend to move both shiftable members, control mechanism for said motor means, a handle connected to partake of one movement to render either end of said lever relatively immovable whereby the application of said force will move the other end of said lever and effect movement of the associated shiftable member, said handle being connected to partake of a second movement for operating said control mechanism, and means for applying a smaller and substantially proportional force to said handle opposing the second named movement thereof from any position simultaneously with the application of said first mentioned force, whereby the operator will always feel a resistance to movement of said handle substantially proportional to the resistance encountered by said motor means in operating said lever, said last named means being constructed and arranged to be inoperative when said motor means is de-energized.

36. The combination with a transmission having a casing and a plurality of members shiftable for providing different gear ratios, of a bearing carried by said casing with its axis extending transversely of the lines of movement of said shiftable members and parallel to the plane of such lines of movement, a shaft mounted in said bearing and having its ends projecting beyond the ends thereof, means connected to be actuated by said shaft to move said shiftable members, selecting means operable for determining which shiftable member shall be actuated upon operation of said shaft, a pair of cranks carried by the respective ends of said shaft externally of said casing, a motor connected to one of said cranks, a control mechanism for said motor, a manually operable mechanism, and means connected between said manually operable mechanism, said control mechanism and the other of said cranks to cause said motor to partake of a follow-up action with respect to said manually operable mechanism.

37. The combination with a transmission including a casing having a plurality of members shiftable for providing different gear ratios, of a pair of adjacent parallel rock shafts projecting from said casing and each provided with an operating crank externally of said casing, means connected to be actuated by one of said shafts to select said shiftable members for actuation, and a floating lever connected to be actuated by the other of said shafts for effecting movement of the selected shiftable member.

38. The combination with a transmission including a casing having a plurality of members shiftable for providing different gear ratios, of a pair of parallel rock shafts projecting from said casing and each provided with an operating crank externally of said casing, means including a floating lever connected between one of said shafts and said shiftable members for delivering a force tending to simultaneously move said shiftable members, and means connected for operation by the other of said shafts upon actuation thereof for rendering said last named means effective for moving only one of said shiftable members.

39. The combination with a transmission including a casing having a plurality of members shiftable for providing different gear ratios, of a pair of rock shafts projecting from said casing and each provided with an operating crank externally of said casing, means connected to be actuated by one of said shafts to select said shiftable members for actuation, means connected to be actuated by the other of said shafts for effecting movement of the selected shiftable member, operating rods connected to said cranks and projecting generally in the same direction from said cranks, and mechanism for selectively transmitting movement to said rods, said mechanism including a common operating handle.

40. The combination with a transmission including a casing having a plurality of members shiftable for providing different gear ratios, of a pair of parallel rock shafts projecting from said casing and each provided with an operating crank externally of said casing, means connected between one of said shafts and said shiftable members for delivering a force tending to move said shiftable members, means connected for operation by the other of said shafts upon actuation thereof for rendering said last named means effective for moving only one of said shiftable members, operating means connected to the respective cranks and comprising rods projecting generally in the same direction from said cranks, and mechanism for selectively transmitting movement to said rods, said mechanism including a common operating handle.

41. The combination with a transmission having a casing and a pair of members shiftable for providing different gear ratios, of a cover plate forming part of said casing, a floating lever having connection at its ends with the respective shiftable members, a rock shaft journaled in said cover plate, an actuating member rigid with said rock shaft within said casing and having operative connection with said lever intermediate said connections, said actuating member being constructed and arranged to be bodily movable with said cover plate, and means constructed and arranged for selectively rendering either end of said lever effective for moving its associated shiftable member upon operation of said shaft.

42. The combination with a transmission having a casing and a pair of members shiftable for providing different gear ratios, of a cover plate forming part of said casing, a floating lever having connection at its ends with the respective shiftable members, a rock shaft journalled in said cover plate, an actuating member rigid with said rock shaft within said casing and having operative connection with said lever intermediate said connections, said actuating member being constructed and arranged to be bodily movable with said cover plate, and selecting means comprising a second rock shaft supported by said casing, and means connected for actuation by said second rock shaft for selectively rendering either end of said lever effective for moving its associated shiftable member upon operation of said first named rock shaft.

43. The combination with a transmission including a casing having a plurality of members shiftable in opposite directions from a neutral position for providing different gear ratios, of a pair of rock shafts carried by said casing and projecting externally thereof, each shaft being provided with a crank on the projecting end thereof, means constructed and arranged to be actuated by one of said shafts to select said shiftable members for actuation, means constructed and arranged to be actuated by the other of said shafts for effecting movement of the selected shiftable member, operating rods connected to said crank ends projecting generally in the same direction therefrom, and a common mechanism for selectively transmitting movement to said rods.

44. The combination with a transmission including a casing having a plurality of members shiftable in opposite directions from a neutral position for providing different gear ratios, of a pair of rock shafts carried by said casing and projecting externally thereof, each shaft being provided with a crank on the projecting end thereof, means constructed and arranged to be actuated by one of said shafts to select said shiftable members for actuation, means constructed and arranged to be actuated by the other of said shafts and effecting movement of the selected shiftable member, operating rods connected to said cranks and projecting generally in the same direction therefrom, and mechanism for selectively transmitting movement to said rods, said mechanism including a common operating handle.

JOHN A. LAWLER.